US008799058B2

(12) United States Patent
Golembiewski

(10) Patent No.: US 8,799,058 B2
(45) Date of Patent: Aug. 5, 2014

(54) SYSTEM AND METHOD FOR ADMINISTERING AN ADVISORY RATING SYSTEM

(75) Inventor: Keith E. Golembiewski, Suffield, CT (US)

(73) Assignee: Hartford Fire Insurance Company, Hartford, CT (US)

(*) Notice: Subject to any disclaimer, the term of this patent is extended or adjusted under 35 U.S.C. 154(b) by 699 days.

(21) Appl. No.: 12/970,010

(22) Filed: Dec. 16, 2010

(65) Prior Publication Data

US 2012/0158465 A1 Jun. 21, 2012

(51) Int. Cl.
*G06Q 10/00* (2012.01)
*G06Q 10/06* (2012.01)
*G06Q 30/02* (2012.01)

(52) U.S. Cl.
CPC ...... *G06Q 10/06393* (2013.01); *G06Q 10/0639* (2013.01); *G06Q 10/06395* (2013.01); *G06Q 10/06398* (2013.01); *G06Q 30/0201* (2013.01)
USPC ....... 705/7.42; 705/7.39; 705/7.38; 705/7.41; 705/7.29

(58) Field of Classification Search
CPC .................... G06Q 10/06393; G06Q 10/0639; G06Q 10/06395; G06Q 10/06398; G06Q 30/0201
USPC ...................... 705/7.42, 7.39, 7.38, 7.41, 7.29
See application file for complete search history.

(56) References Cited

U.S. PATENT DOCUMENTS

| | | | |
|---|---|---|---|
| 6,078,892 A * | 6/2000 | Anderson et al. ............ | 705/7.33 |
| 6,119,097 A | 9/2000 | Ibarra | |
| 7,483,842 B1 * | 1/2009 | Fung et al. ................... | 705/7.14 |
| 7,620,564 B1 * | 11/2009 | Lippock ....................... | 705/7.29 |
| 7,702,522 B1 * | 4/2010 | Sholem ............................ | 705/2 |
| 7,752,054 B1 | 7/2010 | Anthony-Hoppe et al. | |
| 7,769,629 B1 * | 8/2010 | Kriza et al. ................ | 705/14.16 |
| 7,844,527 B2 | 11/2010 | Mannion | |
| 8,484,199 B1 * | 7/2013 | Katragadda et al. .......... | 707/723 |
| 2001/0032156 A1 | 10/2001 | Candura et al. | |

(Continued)

FOREIGN PATENT DOCUMENTS

| | | | | |
|---|---|---|---|---|
| AU | 2007100021 A4 * | 2/2007 | ............. | G06Q 10/00 |
| WO | WO 2009007965 A2 * | 1/2009 | ............. | G06Q 10/00 |

OTHER PUBLICATIONS

Skiera, "Prioritizing Sales Force Decisions Areas for Productivity Improvements Using a Core Sales Response Function," 2008, Journal of Personal Selling & Sales Managers, vol. XXVIII, No. 2, pp. 145-154.*

(Continued)

*Primary Examiner* — Scott L Jarrett
*Assistant Examiner* — Ivan R Goldberg
(74) *Attorney, Agent, or Firm* — Howard IP Law Group, PC

(57) ABSTRACT

Systems and methods are disclosed herein for scoring and ranking financial advisors based on their sales histories. The system includes a database and an advisor rating system processor in communication with the database. The database stores sales history data related to a plurality of financial advisors. The advisor rating system processor obtains data related to financial advisors from the database and calculates a score for each financial advisor based on their sales revenue and sales frequency. The advisor rating system processor then compares the advisors based on these scores and generates a report indicating to which financial advisors a company should market financial products.

20 Claims, 10 Drawing Sheets

(56) References Cited

U.S. PATENT DOCUMENTS

| | | | |
|---|---|---|---|
| 2002/0184043 A1* | 12/2002 | Lavorgna et al. | 705/1 |
| 2003/0208363 A1 | 11/2003 | Thurnher | |
| 2004/0054553 A1* | 3/2004 | Zizzamia et al. | 705/1 |
| 2004/0215504 A1* | 10/2004 | Ikezawa | 705/11 |
| 2004/0249687 A1 | 12/2004 | Lowell et al. | |
| 2005/0187707 A1* | 8/2005 | Yokota et al. | 701/209 |
| 2005/0192831 A1* | 9/2005 | Ellison et al. | 705/1 |
| 2006/0129447 A1* | 6/2006 | Dockery et al. | 705/10 |
| 2006/0161471 A1* | 7/2006 | Hulen et al. | 705/10 |
| 2006/0167777 A1 | 7/2006 | Shkedy | |
| 2006/0190350 A1* | 8/2006 | Maas | 705/26 |
| 2006/0271417 A1* | 11/2006 | Nguyen et al. | 705/7 |
| 2006/0282335 A1* | 12/2006 | Hanks et al. | 705/26 |
| 2007/0050237 A1* | 3/2007 | Tien et al. | 705/11 |
| 2007/0112615 A1* | 5/2007 | Maga et al. | 705/10 |
| 2008/0027769 A1* | 1/2008 | Eder | 705/7 |
| 2008/0086359 A1* | 4/2008 | Holton et al. | 705/10 |
| 2008/0154651 A1* | 6/2008 | Kenefick et al. | 705/4 |
| 2008/0162487 A1* | 7/2008 | Richter | 707/10 |
| 2008/0183552 A1* | 7/2008 | O'Hagan | 705/10 |
| 2008/0189632 A1* | 8/2008 | Tien et al. | 715/764 |
| 2008/0262900 A1* | 10/2008 | Duffy et al. | 705/10 |
| 2009/0012850 A1* | 1/2009 | Stretch et al. | 705/11 |
| 2009/0319344 A1* | 12/2009 | Tepper et al. | 705/11 |
| 2010/0293029 A1* | 11/2010 | Olliphant | 705/9 |
| 2011/0040591 A1* | 2/2011 | Durocher et al. | 705/7 |
| 2011/0131082 A1 | 6/2011 | Masner et al. | |
| 2011/0196716 A1* | 8/2011 | Srinivasan et al. | 705/7.29 |
| 2012/0150588 A1* | 6/2012 | Niedermeyer | 705/7.35 |

OTHER PUBLICATIONS

Kaydos, "Operational Performance Measurement: Increasing Total Productivity," 1999, St. Lucia Press, ISBN: 1-57444-099-3.*

Wilson, "Using online databases for delevoping prioritized sales leads," 2003, Journal of Business & Industrial Marketing, vol. 18, pp. 388-402.*

Caravella, "Privacy, Strategic Information Disclosure and New Customer Acquisition," 2007, Dissertation, Harvard University, Harvard Business School, pp. 1-87.*

Lager, "Looking to Score," Mar. 2009, Customer Relationship Management, vol. 13, Issue 3, pp. 3-40, 42.*

Cherkassky, "B-To-B: Make the Right Calls," Oct. 2006, Target Marketing, vol. 29, No. 10, p. 22, 26.*

* cited by examiner

SYSTEM AND METHOD FOR ADMINISTERING AN ADVISORY RATING SYSTEM

FIELD OF THE INVENTION

In general, the invention relates to a computerized system and method for calculating and using a financial advisor rating from the perspective of a financial products company. More specifically, the invention relates to a computerized system and method for rating and ranking advisors and producing a report indicating to which advisors a financial products company should market a financial product.

BACKGROUND OF THE INVENTION

Financial services companies sell their financial products through financial advisors, brokers, and agents. Investment and insurance companies rely on their wholesaler force to market their products to financial advisors so that the financial advisor can recommend and sell the products and policies to customers. The number of financial advisors selling a company's investment and insurance products can be orders of magnitude higher than the size of a wholesaler force. It is very difficult for wholesalers to effectively market to and maintain relationships with such a large number of advisors. In many cases, rather than marketing towards all financial advisors, it is more beneficial for a wholesaler to put significant, tailored marketing effort into a subset of all financial advisors he is responsible to marketing to, with certain financial advisors identified as promising marketing targets for a given financial product based on their locations, client bases, and sales histories. Because of the overwhelming number of financial advisors a wholesaler is responsible for, it is very difficult for wholesalers to determine to which of the many financial advisors they should focus their marketing efforts, and to then determine the most effective form of marketing for each financial advisor.

SUMMARY OF THE INVENTION

There is therefore a need in the financial industry for a system and method for determining towards which financial advisors a wholesaler should target his marketing efforts. Data currently available on financial advisors' sales levels, top products, territory, and response to marketing campaigns can be harnessed to solve this problem. The system and method disclosed herein leverage available data on financial advisors to score and rank financial advisors and produce output that assists wholesalers in determining how and to whom to market financial products and can automatically generate marketing materials and marketing plans directed at selected financial advisors.

Accordingly, systems and methods are disclosed herein for scoring and ranking financial advisors based on their sales histories. The system includes a database and an advisor rating system processor in communication with the database. The database stores sales history data related to a plurality of financial advisors. The advisor rating system processor obtains data related to financial advisors from the database and calculates a score for each financial advisor based on their sales revenue and sales frequency. The advisor rating system processor then compares the advisors based on these scores and generates a report indicating to which financial advisors a company should market financial products.

In one embodiment, each advisor's score is based on a ratio of the advisor's sales of one company's products to the advisor's sales of all or of other companies' products. The processor can process data from over a period of time to determine sales trends that are used to calculate the advisor score. In another embodiment, the advisor rating system processor compares a company's current financial product line to financial advisor's sales history to determine compatibility between the two. The advisor score is then based in part on this determination of compatibility.

The advisor rating system processor can compare advisors within a given geographic region. In this embodiment, the system may also include a graphical user interface for displaying the locations of the advisors within the geographic region along with their ratings or rankings. Furthermore, the processor may use geographic and travel information along with these locations to generate a route between multiple advisors for the wholesaler to use in travelling from advisor to advisor.

The advisor rating system processor can also be configured to automatically generate electronic communication, such as an email, and send it to a financial advisor based on the financial advisor's score.

According to another aspect, the invention relates to computerized methods for carrying out the functionalities described above.

BRIEF DESCRIPTION OF THE DRAWINGS

The methods and systems may be better understood from the following illustrative description with reference to the following drawings in which.

DESCRIPTION OF CERTAIN ILLUSTRATIVE EMBODIMENTS

To provide an overall understanding of the invention, certain illustrative embodiments will now be described, including systems and methods for rating financial advisors. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
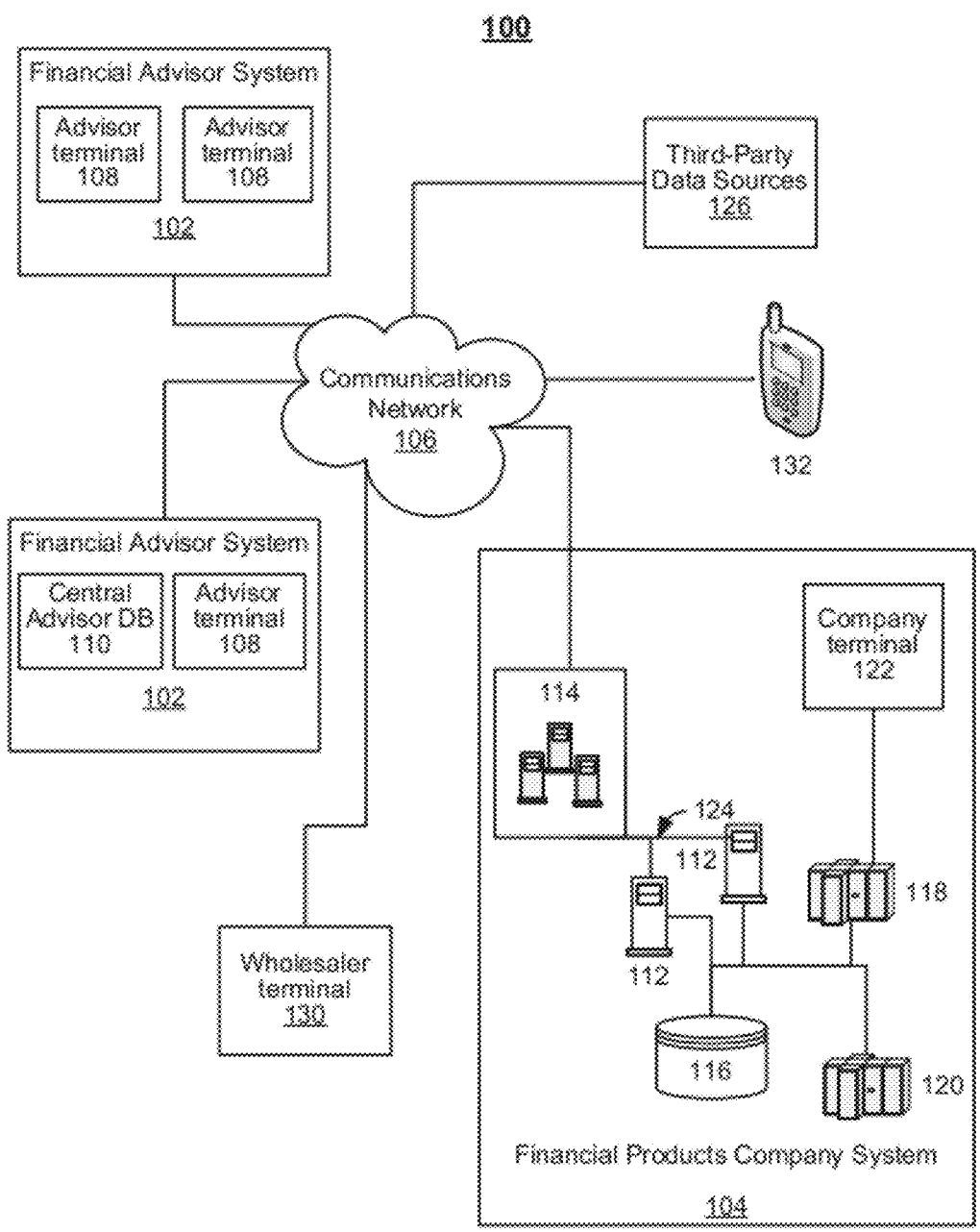
FIG. 1 is an architectural model of a system for scoring and ranking financial advisors, according to an illustrative embodiment of the invention.

FIG. 1 is a block diagram of a system 100 for rating financial advisors, according to an illustrative embodiment of the invention. The term "financial advisor", as used herein, shall refer to an investment advisor representative, registered representative, stockbroker, or independent insurance agent, each of whom may participate in the selling of financial products. Depending on the type of products sold by the financial advisors, registration and/or affiliation with a broker-dealer or other financial advisory firm may be required. The system calculates a rating for individual financial advisors based advisor characteristics, sales data, and other data and information about the financial advisors. A financial products company uses this rating to determine towards whom to market financial products. The term "financial products company", as used herein, shall refer to an investment or insurance company whose products are sold by financial advisors. A financial products company may also include wholesalers, who market financial products to financial advisors. Wholesalers may be employed by a financial products company, or wholesalers may be third-party individuals or employed by a third-party company, for example independent marketing organizations (IMOs) contracted by the financial products company to market financial products. Wholesalers who are not directly employed by the financial products company but who do marketing the financial products company's products are considered a part of the financial products company for the purposes of this application.

The report generated by the system on financial advisors can be in the form of a list of advisors with their scores and ranking. Alternatively or additionally, the report can be or include a map that displays the locations and uses colors or symbols to indicate the ratings or rankings of the financial advisors. The system may automatically generate suggestions of marketing actions to take towards the financial advisors. Furthermore, the report may be input directly into an automated customer relationship management (CRM) system that automates certain marketing activities, such as sending emails or mailings to advisors based on the results of the scoring and ranking.

System 100 includes multiple financial advisor systems 102 in communication with a financial products company system 104 over a communication network 106. Each financial advisor system 102 includes one or more advisor terminals 108 via which individual financial advisors, either independent or part of a brokerage, financial services firm, or insurance company, may interact with the financial products company system 104. Advisor terminals 108 preferably include software via which a financial advisor may obtain information on and purchase financial products for customers of the financial advisor. In one implementation, such software includes a web browser configured for receiving web page data from the financial products company system 104. In alternative implementations, the software includes a thin or thick client that communicates both with the financial products company system 104 as well as a central financial advisor database 110. The central financial advisor database preferably stores data related to financial advisor customers, issued policies, sold investment vehicles, and products available from a single financial firm. The central financial advisor database 110 may execute on one of the financial advisor terminals 108 or on its own computing device. In still another implementation, the software on the advisor terminals 108 includes software for interacting directly with the central financial advisor database 110, which, in turn, includes software to communicate with the financial products company system 104, for example, via a web service. In general, the financial advisor terminals 108 can be any computing device known in the art, including for example, a personal computer, a laptop computer, or a personal digital assistant.

In one implementation, at least a portion of the functionality of one or more financial advisor terminals 108 is carried out by a computing device operated by the financial products company. In this implementation, the financial products company offers a web site for direct customer interaction, for example to purchase a new investment vehicle or request renewal of a pending policy.

The financial products company system 104 includes a plurality of application servers 112, a plurality of load balancing proxy servers 114, a database 116, a financial advisor rating system processor 118, CRM system 120, and company terminals 122. These computing devices are connected by a local area network 124.

The application servers 112 are responsible for interacting with the financial advisor terminals 108. For example, the application servers 112 include software for generating web pages for communication to the financial advisor terminals 108. These web pages serve as user interfaces for the financial advisor to interact with the financial products company system 104. Alternatively, or in addition, one or more of the application servers 112 may be configured to communicate with thin or thick clients operating on the advisor terminals 108. The load balancing proxy servers 114 operate to distribute the load among application servers 112.

The financial products company database 116 stores information about financial products sold by the financial advisors. For each product sold by an financial advisor, the database 116 includes for example and without limitation, the following data fields: the advisor responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof.

In addition to storing data in relation to financial products, the database 116 may also store data separately in relation to each financial advisor. The data may be stored both in aggregate form and broken down by time period. For example, data may be stored by week, month, quarter, six-month period, year, calendar year, and/or the lifetime of the advisor's relationship with the financial products company. For example, the database 116 may store financial product volume data, including the number of new products sold. In addition, or in the alternative, similar volume data may be stored based on a dollar value of products instead of a number of products. In addition, the database 116 may store profitability data associated with the products placed by advisory firm and/or individual advisors. The database 116 may store financial advisors' overall sales figures for sales of all companies' products in addition to sales figures of only the financial products company's products. The database 116 may also store a customer retention factor for each agent and/or employee determined based on the percentage of products sold by the financial advisor that the customer maintains or renews. Additional data stored by the database 116 may include data indicating an advisor's success with selling additional services and implementing available automation tools, including electronic billing, automatic electronic funds transfers, centralized customer service plan selections, and automatic collection of premiums from advisors. Furthermore, for each of the above data types for each time period for which data is stored, the database 116, in one implementation, stores improvement factors indicating a level of improvement over an immediately preceding time period or an equivalent time period from a prior calendar year. To the extent any of this data is not stored by the database 116 separately from overall financial product data, preferably the database stores sufficient data in relation to each policy such that the above-described data could be derived from the available data.

The financial advisor rating system processor 118 is configured to, based on the data stored in the financial products company database 116, score, rank, and generate a report on the financial advisors selling the company's products. In general, and as described further in relation to FIG. 5-9, the financial advisor rating system processor 118 determines financial advisors' scores based at least on the financial advisors' past sales revenues or frequency and generates a report. In addition to using the sales histories, the advisor rating system processor 118 can use advisor profile characteristics, such as geographic location and range, firm the advisor works for, experience, and overall production levels scored in the database along with sales data. In some implementations, the advisor rating system processor carries out other business logic functions, for example billing or processing insurance claims.

Customer relationship management (CRM) system 120 collects and maintains data on all marketing attempts and other contact made between the financial products company and financial advisors. This contact includes but is not limited to email marketing, print mail, internal sales desk calls, and wholesaler visits. For email marketing, the CRM system 120 maintains data on how many emails from the financial products company the financial advisor opens, how many links embedded in an email the financial advisor clicks, and/or how often the advisor opens emails or clicks on embedded links. Similarly, employees of the financial products company or an automated system can track financial advisors' responses to other marketing communications. CRM data can also include data tracking a financial advisor's meeting attendance, seminar attendance, webinar attendance, and requests and usage of illustrations.

The company terminals 122 provide various user interfaces to financial products company employees to interact with the financial advisor rating system processor 118. The interfaces include, without limitation, interfaces to add financial advisors to the financial products company system 104, to adjust financial advisor scoring rules and methods, to manually adjust advisor scores or data, and to retrieve information on financial advisors. In some instances, different users may be given different access privileges. For example, marketing employees may only be able to retrieve information on financial advisors but not make any changes to the database. Such interfaces may be integrated into one or more websites for managing the financial products company system 104 presented by the application servers 112, or they may be integrated into thin or thick software clients. The company terminals 122 can be any computing devices suitable for carrying out the processes described above, including personal computers, laptop computers, personal digital computers, and other computing devices with general purpose processors.

The third-party data sources 126 provide data on financial advisors not generally available in the financial products company database 116 or from financial advisor systems 102. Third-party data can be obtained freely or by purchasing the data from third-party sources, and it may include sales data on advisors and/or additional demographic data. Sales data is especially important to the financial products company, as it allows the company to learn how much a financial advisor sells of the financial products company's competitors' products. If a financial advisor sells a lot of competitors' products, this leaves a large portion of the advisor's sales that could potentially be future sales of the financial products company's products, rather than continued sales of competitors' products. On the other hand, if a financial advisor's sales history indicates that the advisor has a strong relationship with a competitor company, that advisor may be less responsive to a marketing campaign from the financial products company than an advisor without a strong relationship with any particular company. Furthermore, analysis of the products being sold can allow the financial products company to understand why certain competitors' products are popular and how the financial products company can adjust its own line of financial products to better meet demand.

A wholesaler terminal 130, which is separate from the financial products company system 104, allows a wholesaler to access information on financial advisors from the financial products company system 104. For example, wholesalers may use a web or other client interface to connect through the communications network 106 to the financial products company system and obtain advisor scores and rankings when they are offsite. Such access to the system is password protected or requires other credentials to access information. Wholesaler terminal 130 may be any computing device known in the art, including for example, a personal computer, a laptop computer, or a personal digital assistant. Handheld device 132 similarly allows wholesalers to access information the financial advisor rating system 104 through the communications network 106. Handheld device 132 is depicted as a mobile wireless device such as a cell phone or smart phone. However, it may be any portable device, such as a laptop, notebook, tablet computer, palm-sized computer, or any electronic device with capability to receive wireless signals. Wholesaler terminal 130 and handheld device 132 may also allow their users to enter in data that is sent through the communications network 106 and inputted into the financial products company database 116.

Figure 2:
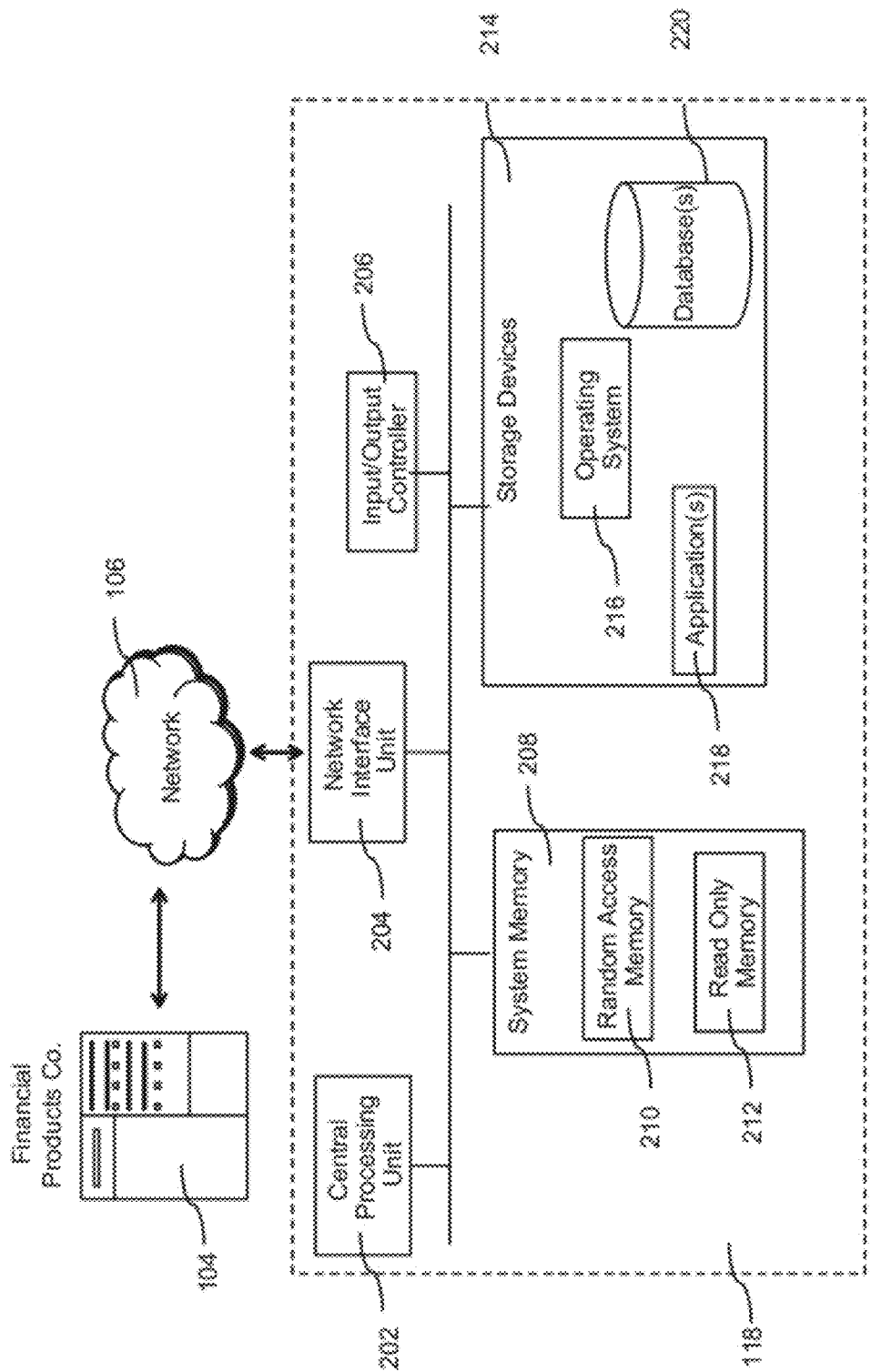
FIG. 2 is a block diagram of a computer architecture suitable for implementing various servers incorporated into the system of FIG. 1, according to an illustrative embodiment of the invention.

FIG. 2 is a block diagram of the financial advisor rating system processor 118 used in FIG. 1 for rating financial advisors, according to an illustrative embodiment of the invention. The advisor rating system processor 118 comprises at least one central processing unit (CPU) 202, system memory 208, which includes at least one random access memory (RAM) 210 and at least one read-only memory (ROM) 212, at least one network interface unit 204, an input/output controller 206, and one or more data storage devices 214. All of these latter elements are in communication with the CPU 202 to facilitate the operation of the advisor rating system processor 118. The advisor rating system processor 118 may be configured in many different ways. For example, the advisor rating system processor 118 may be a conventional standalone computer or alternatively, the function of advisor rating system processor 118 may be distributed across multiple computer systems and architectures. In the embodiment shown in FIG. 1, the advisor rating system processor 118 is linked, via network 106 or local network 124 (also described in FIG. 1), to other servers or systems housed by the financial products company system 104, such as the load balancing server 114, and the application servers 112.

The advisor rating system processor 118 may be configured in a distributed architecture, wherein databases and processors are housed in separate units or locations. The advisor rating system processor 118 may also be seen as a server located either on site near the financial products company system 104, or it may be accessed remotely by the financial products company system 104. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The data storage device 214 may store, for example, (i) an operating system 216 for the advisor rating system processor 118; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. In some embodiments, the database(s) 220 includes a database storing financial advisors' information relevant to rating the financial advisors, including all or a subset of data stored in external financial products company database 116 described above with respect to FIG. 1, as well as additional data, such as formulas or manual adjustments, used in rating the advisors.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions used to rate financial advisors as described in relation to FIGS. 5-9. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the processor 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
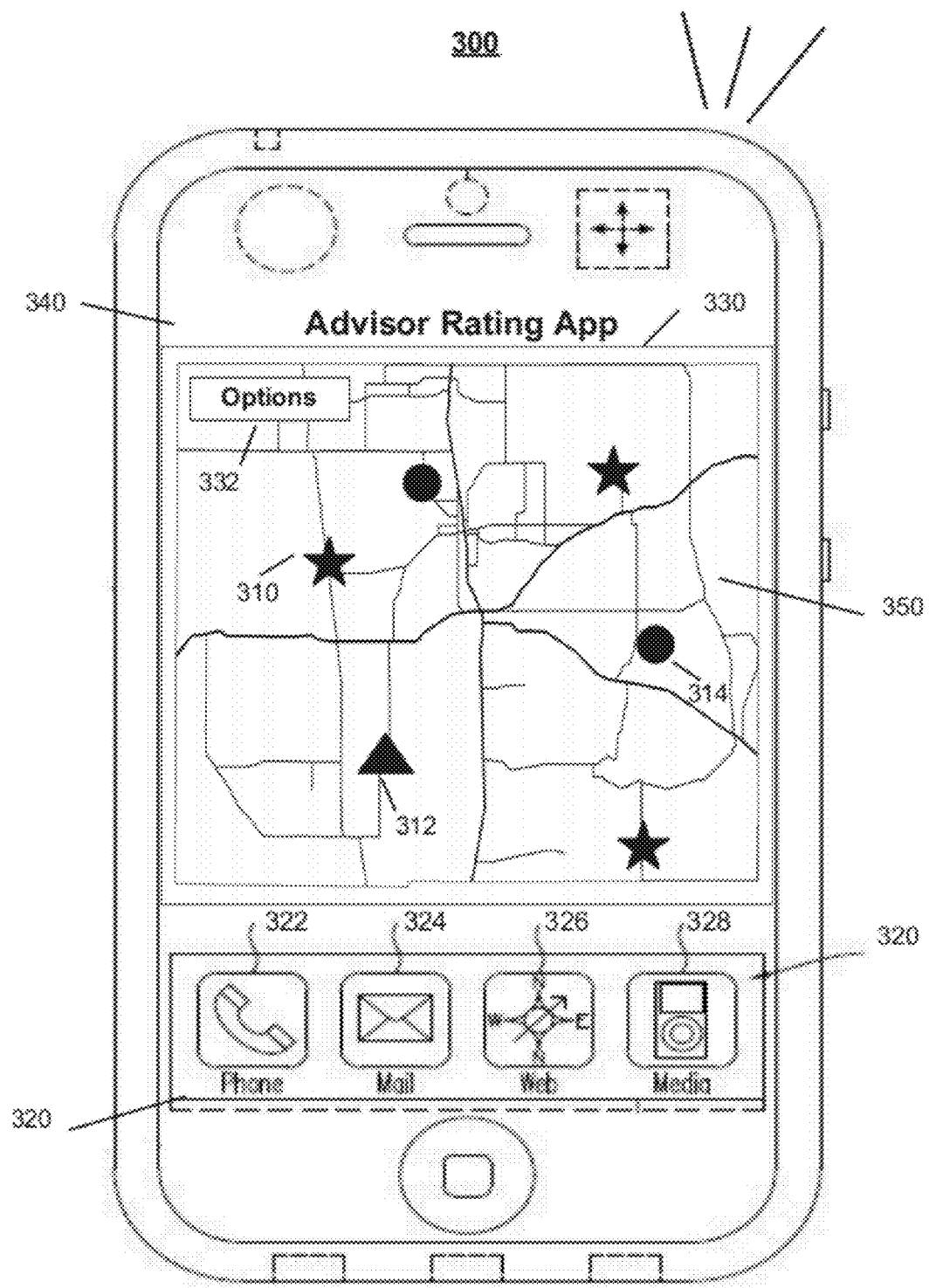
FIG. 3 is a diagram of a mobile device for executing an application for presenting locations and ratings of financial advisors, according to an illustrative embodiment of the invention.

FIG. 3 depicts an interactive graphical user interface configured to allow a user to view on a mobile device 300 a map of financial advisors and their ratings as determined by the advisor rating system software application. As shown, the mobile device can launch one or more applications by selecting an icon associated with an application program. As depicted, the mobile device 300 has several primary application programs 320 including a phone application (launched by selecting icon 322), an email program (launched by selecting 324), a web browser application (launched by selecting icon 326), and a media player application (launched by selecting 326). Those skilled in the art will recognize that mobile device 300 may have a number of additional icons and applications, and that applications may be launched in other manners as well. In the embodiment shown, an application, such as an advisor rating application 330, is launched by the user tapping or touching an icon displayed on the touch screen 340 interface of the mobile device 300.

Once advisor rating system application 330 is launched, the user may interact with advisor rating application 330, and mobile device 300 may function pursuant to the program instructions associated with the application. During operation, mobile device 300 is in communication with remote systems, such as the financial products company's computer system that includes a database on financial advisors. Graphical display 350 allows the user to view information about rated financial advisors. As depicted, financial advisors' office locations are marked on a map using symbols that represent the advisors' ratings or rankings. As shown, some advisors are marked on the map with stars 310, others with triangles 312, and others with circles 314. These shapes represent which category or ranking the advisors belong to; for example, stars 310 may sell the most of a certain financial product, triangles 312 may sell a lesser amount of that financial product, and circles 314 may sell little or none of that financial product. Display settings can be changed by selection of the "Options" button 332. These display settings are discussed in greater detail with respect to FIG. 4.

The user may click on one of the symbols 310-314 on the map to display a pop-up with the contact information, such as email address, telephone number, and address, of the advisor at that location. From this contact information pop-up, the user can initiate a communication with the selected financial advisor. Selecting the advisor's email address causes an email program on the mobile phone to open and automatically create a blank email addressed to the advisor on the user's computer. Selecting the advisor's telephone number brings up another pop-up, from which the user can choose to either call the advisor's phone number or send an SMS text message. Selecting the advisor's address causes a routing component in the application to determine a route to that address from the phone's current location. Alternatively, selecting the address causes the application to send the address to a different application that determines and displays the route to the address.

Figure 4:
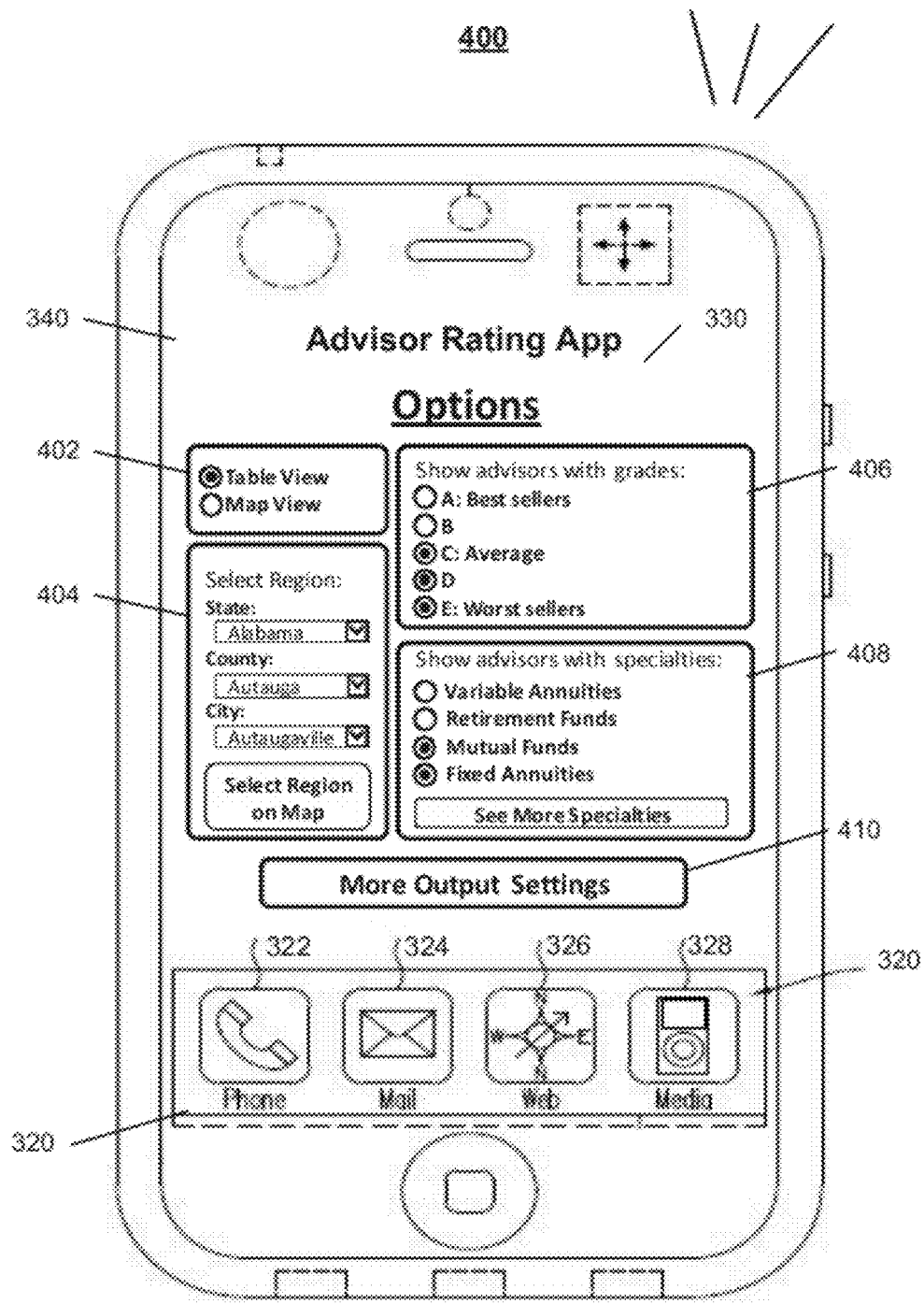
FIG. 4 is another diagram of a mobile device for executing an application for presenting locations and ratings of financial advisors, according to an illustrative embodiment of the invention.
Figure 7:
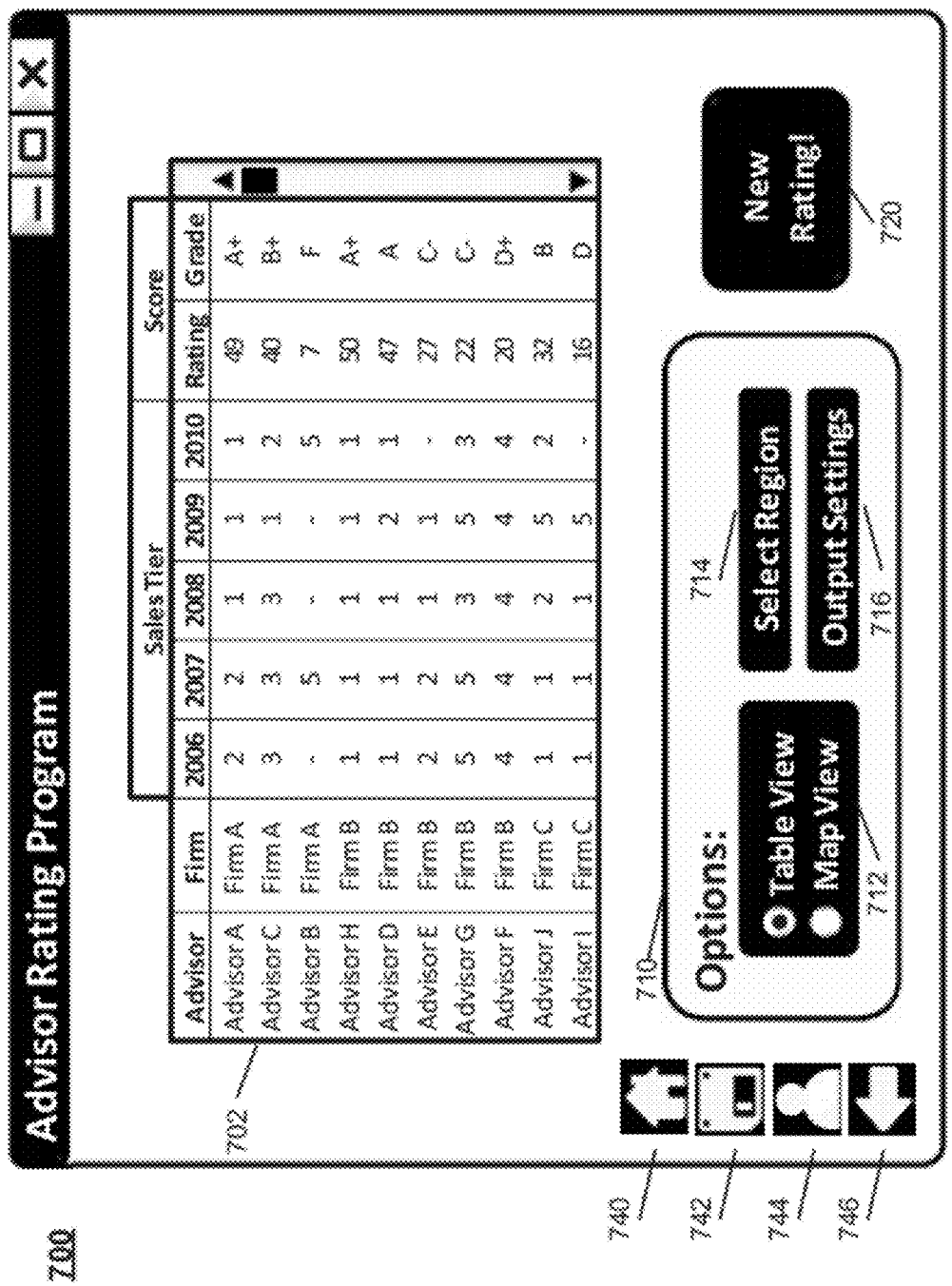
FIG. 7 is a diagram of a graphical user interface for displaying scores and ratings of financial advisors, according to an illustrative embodiment of the invention.
Figure 9:
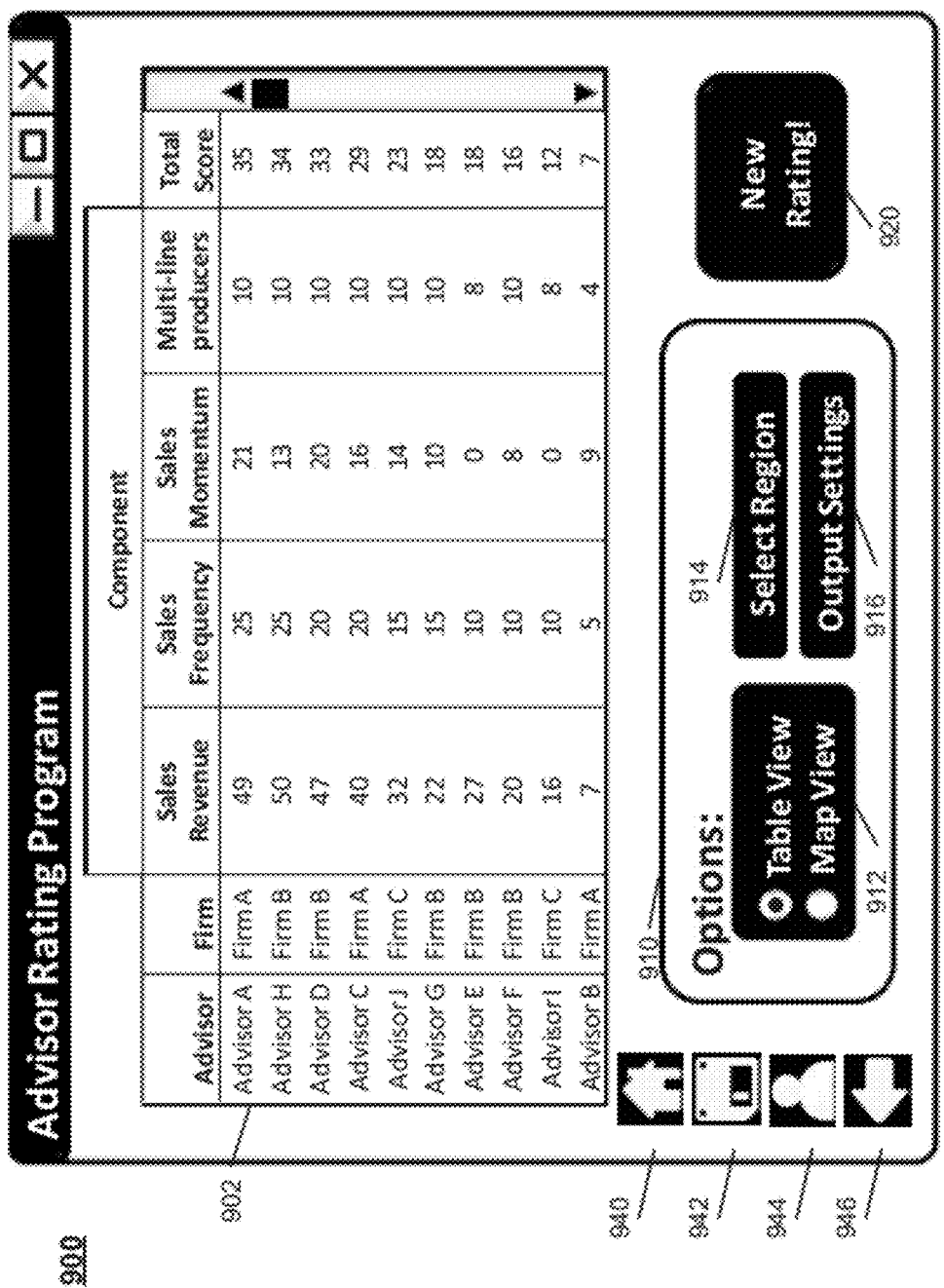
FIG. 9 is a diagram of another graphical user interface for displaying ranked scores and ratings of financial advisors, according to an illustrative embodiment of the invention.

FIG. 4 depicts another interactive graphical user interface configured to allow a user to adjust on the mobile device 300 settings and options of the advisor rating system software application 330 on the options screen, accessed through "Options" button 332 on FIG. 3. Table/Map view setting box 402 allows the user to choose whether to view the advisors on a map, as depicted in FIG. 3, or on a table, implementations of which are shown in FIG. 7 and FIG. 9. Location box 404 allows the user to select the region; advisors from the selected region will be rated by the software application. As shown in FIG. 4, the user selects a state, a county within that state, and a city within that county to focus on. Alternatively, the user can click the button "Select Region on a Map" to bring up another screen showing a map, though which a user can select a region by zooming, clicking on cities, bounding off an area, or through other means. In one embodiment, the advisor rating application 330 automatically determines the geographic region to display using the mobile device's location, obtained through GPS data, cell phone tower triangulation, or other means. In this case, the size of the area displayed may be based on the density of financial advisors in a region. In a region dense with financial advisors, the area shown is smaller than a region in which financial advisors are sparse. This way, the number of advisors shown on the map at one time is reasonable for the viewer to look at. For example, displaying twenty advisors on the screen is reasonable for a viewer to process. In a large city, there may be twenty financial advisors within a four-block area, so only this small area would be shown. On the other hand, in a rural region, the application would need to display many square miles to show twenty financial advisors.

Advisor selection boxes 406 and 408 allow the user to choose a subset of all advisors in a region to view. Rating selection box 406 allows the user to determine which grades of advisors he wants to look at. For example, if he only wants to target the very best advisors, he would select only "A: Best Sellers." Product selection box 408 allows the user to see users who specialize in particular financial products, as determined by sales figures, certifications, or other criteria. The user can select any combination of advisors or all advisors. Other desired output settings that do not fit on a single options screen can be shown by clicking on the "More Output Settings" button 410. Further output settings could include display settings, such colors and fonts, or settings related the types of information displayed.

Once the advisor rating software application 330 has rated a set of financial advisors, a routing component of the advisor rating application 330 can generate a route to one or more financial advisors so that the user may drive from his current location to a first financial advisor's offices, and possibly one or more financial advisor's offices after the first. The user may enter preferred starting and ending points, enabling the routing component to build the most efficient route with regard to the starting and ending points. The routing component may determine the most efficient route based on shortest distance, shortest time, lowest gasoline consumption, avoiding tolls, or any other rules or combination of rules. The user may also enter appointments with time and/or location constraints that the routing component must work around when planning the route. The user may enter the length of time that he plans to spend visiting each financial advisor, the suggested time may be determined by the application rating application 330, or the suggested time may be retrieved from the financial products company's computer system. Some of these options may be set in the "More Output Settings" button 410. The application may send records of the user's travels back to the financial products company's computer system so that the company can track its employees' activities. Rather than including the routing ability in the application itself, the advisor rating application 330 may send the advisors' locations to another application on the mobile device, for example GOOGLE MAPS, to perform the routing and/or display the route to the user.

Figure 5:
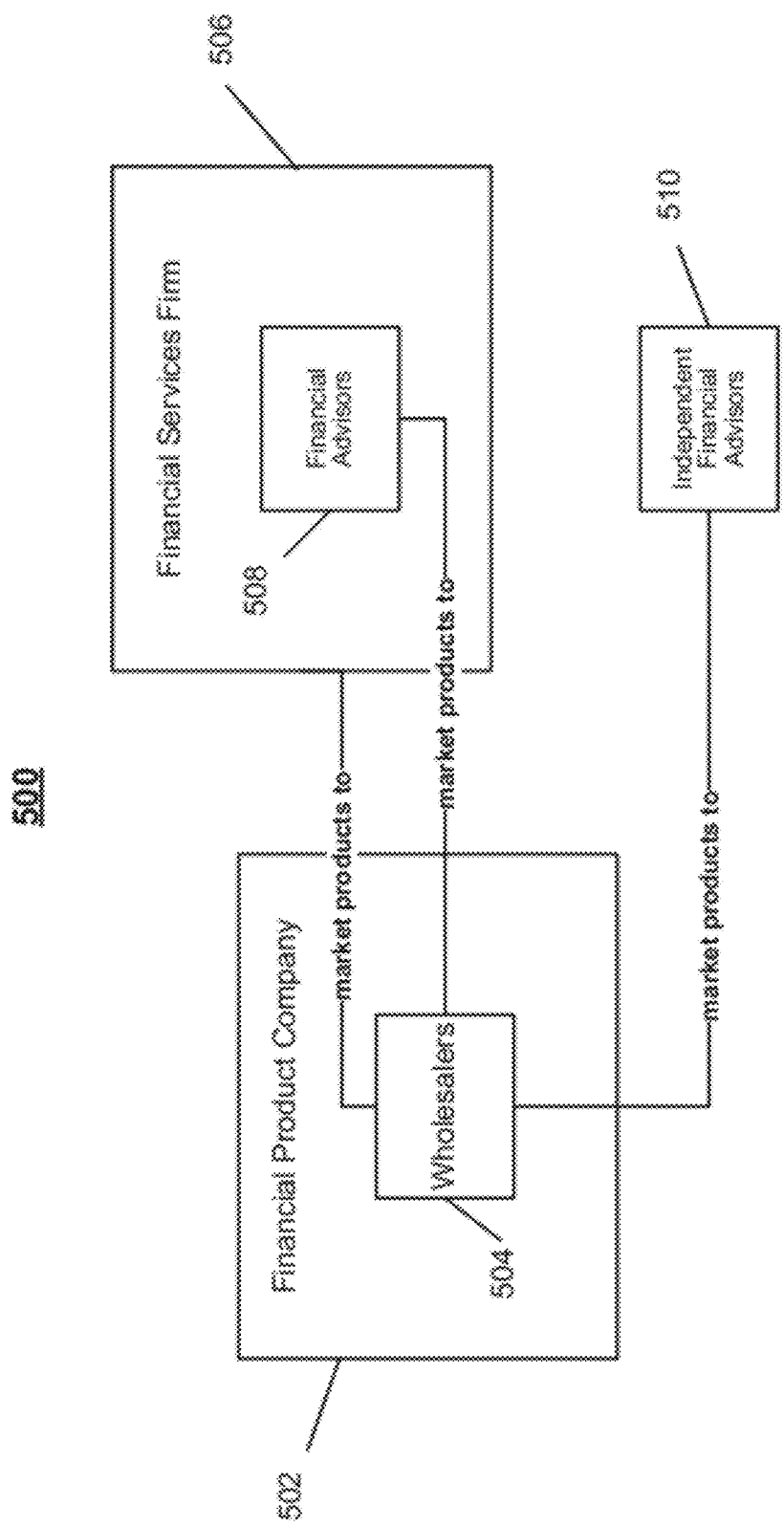
FIG. 5 is a diagram representing the relationship between financial products companies and financial advisors, according to an illustrative embodiment of the invention.

FIG. 5 is a block diagram that shows the relationships between financial products companies and financial advisors. As defined above, a financial products company 502 is an investment or insurance company whose products are sold by financial advisors. A financial products company 502 sells, underwrites, or manages a financial product, such as an insurance plan, annuity plan, mutual fund, or retirement fund. Financial advisors sell one or more financial products provided by the financial products company 502 to individual or business clients. Some financial advisors 508 work for a financial services firm or brokerage 506. Independent financial advisors 510 are not associated with a firm or brokerage. The financial products company 502 employs one or more wholesalers 504 to market its products to financial services firms or directly to individual financial advisors. These wholesalers 504 or other employees of the financial products company 502 that work with the wholesaling staff are the intended users of the financial advisor rating system, which uses data on the financial services firms 506 and financial advisors 508. Wholesalers are typically assigned to a particular product line and/or a geographic region.

Figure 6:
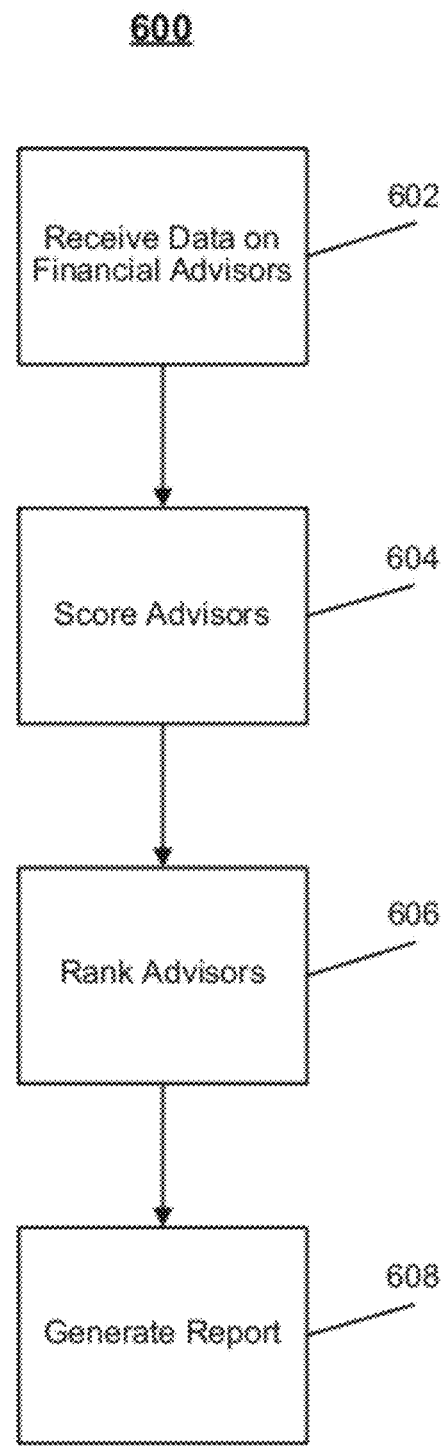
FIG. 6 is a flowchart for a method of scoring and ranking financial advisors, according to illustrative embodiments of the invention.

FIG. 6 is a flowchart for a method of rating financial advisors performed by a financial advisor software application, according to an illustrative embodiment of the invention. The method 600 begins with receiving data on financial advisors 508 and/or 510 (step 602). The financial products company 402 maintains data on at least the advisors that sell their products, and may also acquire data on other financial advisors that do not sell their products. Advisor data is housed in and retrieved from financial products company database 116. This includes sales data and basic information on the advisors, such as their office locations and employers as applicable, and may also include customer relationship management (CRM) system records, touchpoint response data, total sales figures of all companies' products, or any other data relating to the financial advisors. Data sources are discussed in greater detail with respect to FIG. 10.

The financial advisor application may only retrieve data related to a subset of all financial advisors. For example, the application may only collect data on financial advisors that sell a particular product line or work for a certain firm or brokerage. The application may only collect data on financial advisors that have offices or customers in a specified geographic region. Alternatively, the application may collect data on all financial advisors, but then select only a subset of the advisors based on the same type of guidelines mentioned above on which to perform the rest of the rating method.

Once the necessary data has been obtained, the financial advisor application calculates scores for the financial advisors (step 604) based on the data retrieved in step 602. The advisor scores can be based on a number of factors, such as financial products sale revenue and sales frequency, trends in sales over time, percentage of total sales that are the financial products company's products, data from a CRM system, and advisors' responses to various touchpoints, such as phone or email campaigns, seminars, and visits from wholesalers. The types of data sources are discussed on greater detail with respect to FIG. 10. The score may be calculated from just one of the aforementioned factors or from a weighted combination of components. The scoring may be along a scale, such as from 0 to 50. The score calculation is discussed in greater detail with respect to FIGS. 7-8.

Once the scores are calculated, the financial advisor application ranks the advisors (step 606). The application may break the financial advisors into groups. These groups may be based on the absolute score, for example, assigning all advisors with a score between 40 and 50 to Group A, all advisors with a score between 30 and 40 to group B, and so forth. Alternatively, the top twenty percent highest scores may be assigned to Group A, the next twenty percent to Group B, or so forth. The groups may follow a bell curve or other curving method, or other group formation strategies may be used. If the advisors are scored in this fashion, they may be given rankings or broken into subgroups within their groups. Alternatively, the advisors may be individually ranked in a list. The user of the application could then select to focus on only advisors whose scores are within a certain range.

Finally, the application generates a report on the financial advisors. The report can take various forms, but in its most basic form it is a ranked list of financial advisors' names or other identifiers and their scores. If addresses of the financial advisors are known, the report may be a map with the financial advisors marked. Symbols, colors, or numbers may be used on the map to indicate each financial advisor's ranking or to which group each advisor was assigned based on his score, as shown in FIG. 3. In one embodiment, the report is a list including advisor names and addresses, telephone numbers, and/or email addresses for wholesalers or other representatives from the financial products company to contact. In another embodiment, the report is sent directly to the customer relationship management (CRM) system, which automatically processes the report and carries out actions based on the scores. For example, the CRM system may automatically send emails to financial advisors based on their scores. The CRM system may send emails to only a subset of the financial advisors, and it may compile different emails for different advisors based on their score and other factors, such as results of past marketing strategies. The CRM system may alternatively prepare physical mailings or marketing material to mail to financial advisors. In one embodiment, the financial advisors' score relates to the advisors' sales trends over time, and the application compares the scores to past marketing strategies. In this embodiment, the application determines if the past marketing strategies have been successful and determines strategies for future marketing. These marketing strategy suggestions are included in the report generated by the software application.

FIG. 7 is a screenshot of a software implementation of the advisor rating system. This screenshot shows a table of rated and graded financial advisors 702. The scrollbar to the right of the table allows the user to navigate the list and view more table entries. In this illustration, the list is grouped according to the firm that the advisors work for. The individual advisors at those firms are ranked in the output table. Other arrangements are possible, and the arrangement of output listings can be changed using the "Output Settings" button described in more detail below. The listing for each advisor includes his sales tier for the past five years, his overall rating based on the sales tiers, and his grade assigned based on the rating. The sales tier is determined using the advisors' sales revenue in the financial product(s) of interest that year. The application can determine the sales tier by ranking all advisors and assigning the tiers based on their revenues relative to each other, or the application can assign a sales tier based on falling within a predetermined revenue range, regardless of how other advisors score. To determine each advisor's rating, the yearly tiers are combined by simply adding them or by weighing and adding them. Years in which the financial advisor has not made any sales of the financial product(s) of interest, marked "-" in the table 702, are assigned sales tier 0 for computing the sales rating. In the embodiment illustrated in FIG. 7, the sales rating is computed with the following formula:

$$\text{Sales Rating} = (0.5 * ST_{Y-4}) + (1.0 * ST_{Y-3}) + (2.0 * ST_{Y-2}) + (4.0 * ST_{Y-1}) + (6.0 * ST_Y)$$

In the above formula, $ST_Y$ is the advisors' sales tier for the current year, and $ST_{Y-N}$ is the sales tier the advisor was in N years before the current year. The above formula creates a sales rating between 0 and 67.5, and it weighs more recent years more heavily. This rating can be normalized to fall between 0 and 1, 0 and 50, 0 and 100, or any other convenient scale. In FIG. 7, the rating has been normalized to fall between 0 and 50, and a higher value for the rating indicates higher sales revenue. This rating is then given a letter grade. In table 702, the letter grade is assigned using a fixed scale, but the letter grade could alternatively be determined using a curve.

The aforementioned weights and formula are merely illustrative in nature. Weights and variables used in the rating could be entered manually or automatically determined. In one embodiment, the weights are selected by processing the stored advisor data using a computerized predictive model. Data on past sales as well as the history of marketing efforts can be input into a predictive model that can automatically process the data to better refine the weights. Predictive modeling techniques and training methods are discussed in U.S. patent application Ser. No. 11/961,380, the entire contents of which are incorporated herein in its entirety.

The user may click on any entry in this table to display a pop-up with the advisor's contact information. Alternatively, the contact information may be found in additional columns in the table. In either embodiment, the advisor rating software is integrated with the company's communication system, allowing the user to initialize contact with the financial advisor. Clicking on the advisor's email address causes an email program, such as Microsoft Outlook or Mozilla Thunderbird, to open and automatically create a blank email addressed to the advisor on the user's computer. If the company's computer system is integrated with the company's phone system, clicking on an advisor's phone number causes the user's telephone to dial that financial advisor's telephone number.

In Options panel 710, clicking the "Select Region" button 714 causes the application to display another window that allows the user to select a geographic region. The advisor rating software application scores and ranks only financial advisors who work within the selected geographic region. Determining whether or not a financial advisor works within a geographic region may be based on where his office is located, where his current customers are located, or by another location-based rule. The application may allow a user to select a geographic region on a map. Alternatively, the application may allow a user to select a location using a menu or list system in which the user selects a state, province, city, metro area, or other type of geographic region. A user may be permitted to select more than one geographic region.

In Options panel 710, The "Table View" and "Map View" radio buttons 712 allow the user to select to view the output of the advisor ranking either in a table or on a map. Clicking the "Output Settings" button 716 causes the application to display another window in which the user can select further options for the output. Output settings may include whether to separate advisors into groups based on their score and how these groups should be defined. They may include the order in which to list the advisors, e.g. by firm, by score, or by alphabetical order of advisors' names. The output settings may include visual options, such as colors, font style, and font size. Other ways in which to customize the output can be included in the "Output Settings" window.

The "New Rating" button allows the user to start over and run a different rating, choosing different options, such as how to score and rank advisors and which advisors to rank. As will be further detailed with respect to FIG. 7, there are many more ways to rank advisors than on sales revenue data alone.

The four buttons 740-746 in the lower left hand corner of the screen are used to further control the application. Button 740 is the "Home" button, and clicking it makes a home or welcome page appear. Button 742 is the "Save" button, and clicking it brings up a screen from which a user can select a location and file name for storing the output report. Button 744 is the "Help" button, and clicking it brings up a help screen from which the user can receive assistance in using the software application. Button 746 is the "Back" button, and clicking it returns the screen to the previous screen. If any settings or options were adjusted after the rating was run, the "Back" button returns to the previous settings or options.

Figure 8:
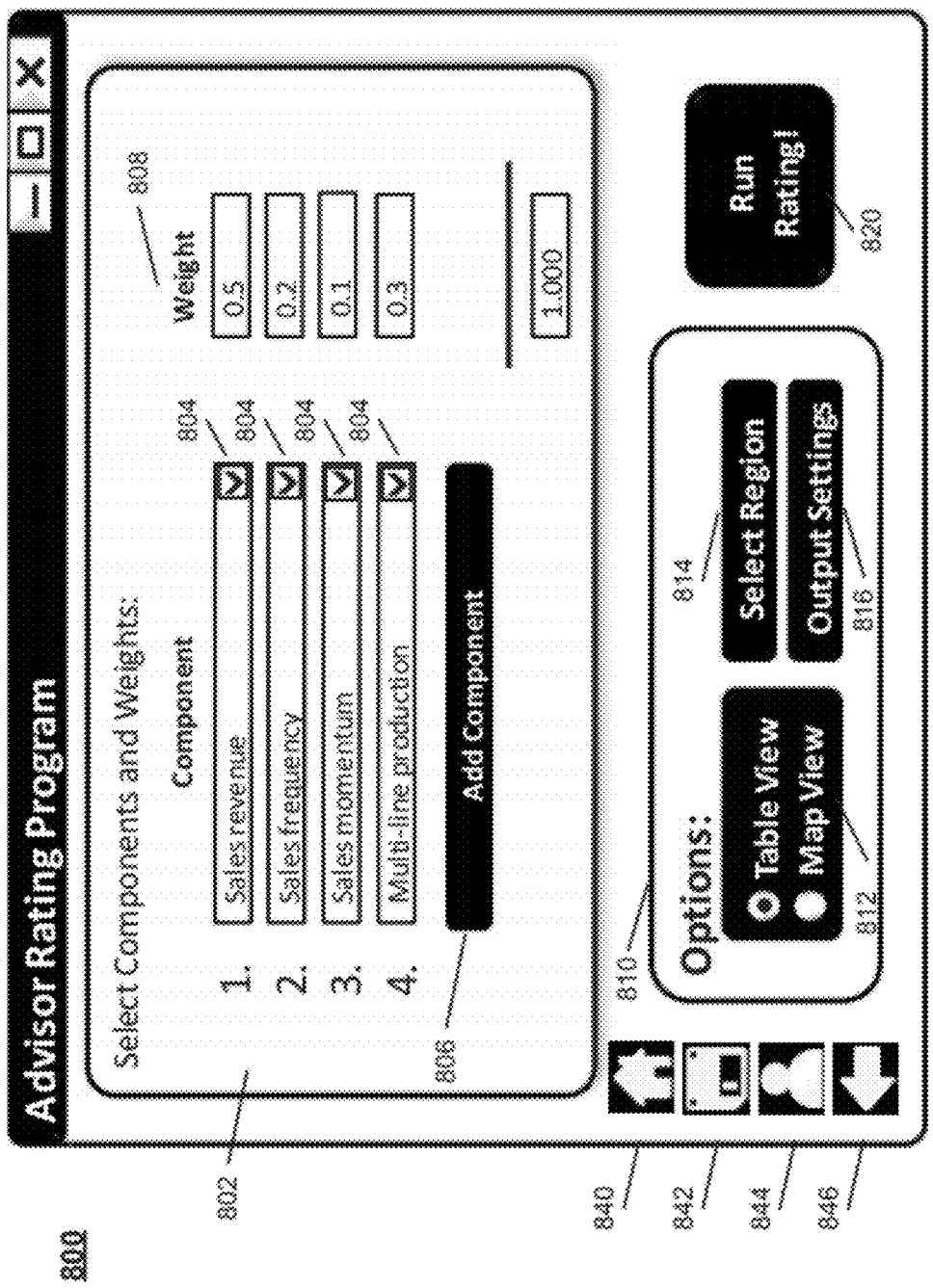
FIG. 8 is a diagram of another graphical user interface for selecting components with which to rate financial advisors, according to an illustrative embodiment of the invention.

FIG. 8 is another screenshot of the software implementation of the advisor rating system. Whereas the screenshot of FIG. 7 showed the results of scoring a single component, in that case sales revenue, this screenshot depicts an input screen allowing the user to choose multiple components and enter weights for those components. When the rating is calculated, each component score is calculated in a manner similar to how the sales revenue rating was calculated above, preferably using data over multiple years. Then, the overall rating is calculated according to the weights assigned in the Weights column 808. The output of this scoring process is shown in FIG. 9. The component entry pane 802 includes drop-down menus 804 for the possible scoring components. If the user would like to include more factors in the score than are currently available, he may click the "Add Component" button 806 to display another drop-down menu and weight entry. If the number of components becomes too large to fit in the component entry pane, a scroll bar (not shown) will appear at the right-hand side of the component entry pane 802, allowing the user to navigate and view all components.

For each component, the user must enter a weight. For guidance, the total of all the weights the user has entered is shown at the bottom of weight column 808. The user need not make the weights add up to one; the software application can normalize the weights the user has entered. The options pane 710 is identical to the options pane 710 in FIG. 7. The four buttons along the left 840-846 are identical to the four buttons 740-746 in FIG. 7. "New Rating!" button 720 has been replaced in this screen by the "Run Rating!" button 820. Clicking the "Run Rating!" button 820 causes the application to calculate the financial advisor ratings according to the selected components and weights and display the output according to the user's specifications in the Options panel 810. The output of the components and weights in FIG. 8 is shown in and described with respect to FIG. 9.

Four possible scoring components are shown in FIG. 8: Sales revenue, Sales frequency, Sales momentum, and Multi-line production. Sales revenue is a measure of the financial advisor's sales levels. Sales frequency is a measure of how often a financial advisor sells financial products, measured in number of sales during a time period. Sales momentum is a measure of how a financial advisor's sales levels are increasing or decreasing over time. Multi-line production is a measure of a financial advisor's loyalty to a financial products company, determined by whether a financial advisor sells multiple product lines from the same financial products company. In all cases, it is helpful to have this type of data over a period of time, with data broken down into segments such as years or quarters, for use in determining subscores as was shown in the calculation described above with respect to FIG. 6.

In addition to overall sales measures, additional scoring components could be sales revenue, sales frequency, and sales momentum of particular products or types of products, such as variable annuities, mutual funds, and retirement plans. For example, if a financial products company is interested in selling a new variable annuity, they may only care about financial advisors' sales data on variable annuities. In this case, components of interest would include variable annuity sales revenue, variable annuity sales frequency, and variable annuity sales momentum, and the user may not be concerned with financial advisors' total sales data of all financial products.

For variable annuity products in particular, the features sold by financial advisors can be used in rating the advisors.

Types of features and investments chosen, such as annuity chassis, death benefit elections, fund selection, and living benefit elections and utilizations, that a financial advisor is typically able to sell can be used to determine what similar features the advisor would be able to sell in the future. For example, if a wholesaler wants to target advisors who sell variable annuities with funds tailored for equity growth, rather than just looking at variable annuity fund sales data, the rating system would score an advisor who often sells variable annuities with equity growth funds and similar funds more highly than an advisor who mainly sells variable annuities with fixed income funds. On the other hand, if a financial advisor sells only variable annuities for equity growth and these funds are no longer supplied by the financial products company, that advisor should rank low for future targeting as he would be unlikely to sell the current product line. Weighting certain product features or options can be similarly used in ratings in products other than variable annuities as well.

The advisor rating application can also factor the advisors' profile characteristics, such as their territory, firm they work for, overall production levels, and experience, into the rating. Territory can be compared to a listing of income, housing prices, or other measures of wealth for a region, defined for example by zip code or municipality. This allows the application to associate the wealth of a region, which correlates to the amount of money spent on financial plans and policies, with advisors in that region. A high level of income in an advisor's territory increases the advisor's score, as he would likely be able to attain higher sales figures. More directly, a financial advisor's overall sales figures indicate whether the advisor would likely have higher future sales figures, with a high sales figure reflecting positively in his score. On the other hand, even if a financial advisor's overall sales figure is high but the amount of the product the financial products company intends to market is relatively low, this financial advisor may not be a good advisor to target as the financial product is not one of his specialties, and this would reflect negatively in his score. These types of scores related to demographic and overall sales data can be based on third party data 126, discussed in relation to FIG. 1. The firm an advisor works for may also positively or negatively impact his score. If a financial services firm has a strong relationship with the financial products company, this would reflect positively in its advisors score, and vice versa.

Other components not based on sales data are useful in rating financial advisors. Information from the customer relationship management (CRM) system 120 is especially valuable in tracking all marketing attempts, or touchpoints, and other contact made between the financial products company and financial advisors, including but not limited to email marketing, print mail, internal sales desk calls, and wholesaler visits. For email marketing, the CRM system maintains data on how many emails from the financial products company the financial advisor opens, how many links embedded in an email the financial advisor clicks, and/or how often the advisor opens emails or clicks on embedded links. Similarly, employees of the financial products company or an automated system can track financial advisors' responses to other marketing communications. CRM data can also include record a financial advisor's meeting attendance, seminar attendance, webinar attendance, and requests and usage of illustrations provided by the financial products company. The advisor's rating can be either positively or negatively affected by the financial advisor's response to previous marketing attempts.

If an advisor has received a lot of marketing outreach but has not responded to the marketing or, more importantly, has not increased sales of the financial products company's products, the advisor's score is negatively impacted. However, if past marketing has proven to be a success, then this is seen as evidence that the marketing is working, and the financial advisor is given a high score for the touchpoint component. This touchpoint data is especially useful in generating recommendations for future marketing approaches toward financial advisors. If a particular tactic has proven useful, the financial advisor report can recommend that the same type of marketing strategy be used to reach out to the financial advisor. On the other hand, if a financial advisor is not responding to a tactic, the rating application suggests a different form of marketing in the automatically generated report. Automated actions to taken by the CRM system based on the report are discussed with respect to FIG. 10.

In addition to calculating scores based on the aforementioned data sources, scores or ratings can be manually adjusted based on knowledge that cannot be captured by the data sources. For example, a wholesaler knows that an advisor recently had a bad experience with the financial products company and has decided to no longer carry the company's products. For a period of time, that financial advisor may still have high scores in one or more scoring components. To prevent a misleading rating or ranking, the wholesaler should manually lower this financial advisor's score to reflect his poor potential for selling the company's products.

FIG. 9 shows the output of the advisor rating software application that was run using the configuration from FIG. 8. Each component score (sales revenue, sales frequency, sales momentum, and multi-line production) was calculated for each advisor using the data for the past five years, in the same manner that the sales revenue ratings were calculated in FIG. 7. Then, the scores were weighted using the weights inputted in FIG. 8, calculated as follows:

$$\text{Total Score}=(0.5*\text{Sales Revenue})+(0.2*\text{Sales Frequency})+(0.1*\text{Sales Momentum})+(0.3*\text{Multi-line Production})$$

This formula created a score between 0 and 35.5. The scores could be normalized to fall between 0 and 1, 0 and 50, 0 and 100, or any other scale. The advisors were then ranked from highest score to lowest score and displayed in the table according to their rank, without regard to what firm the advisors were employed by. The selection of components and the weights chosen in FIG. 8 and FIG. 9 are merely illustrative in nature; different components can be chosen and the weights can be adjusted by the user of the software.

The options pane 910 is identical to the options pane 710 in FIG. 7. The four buttons along the left 940-946 are identical to the four buttons 740-746 in FIG. 7. "New Rating!" button 920 is identical to the "New Rating!" button 720.

Figure 10:
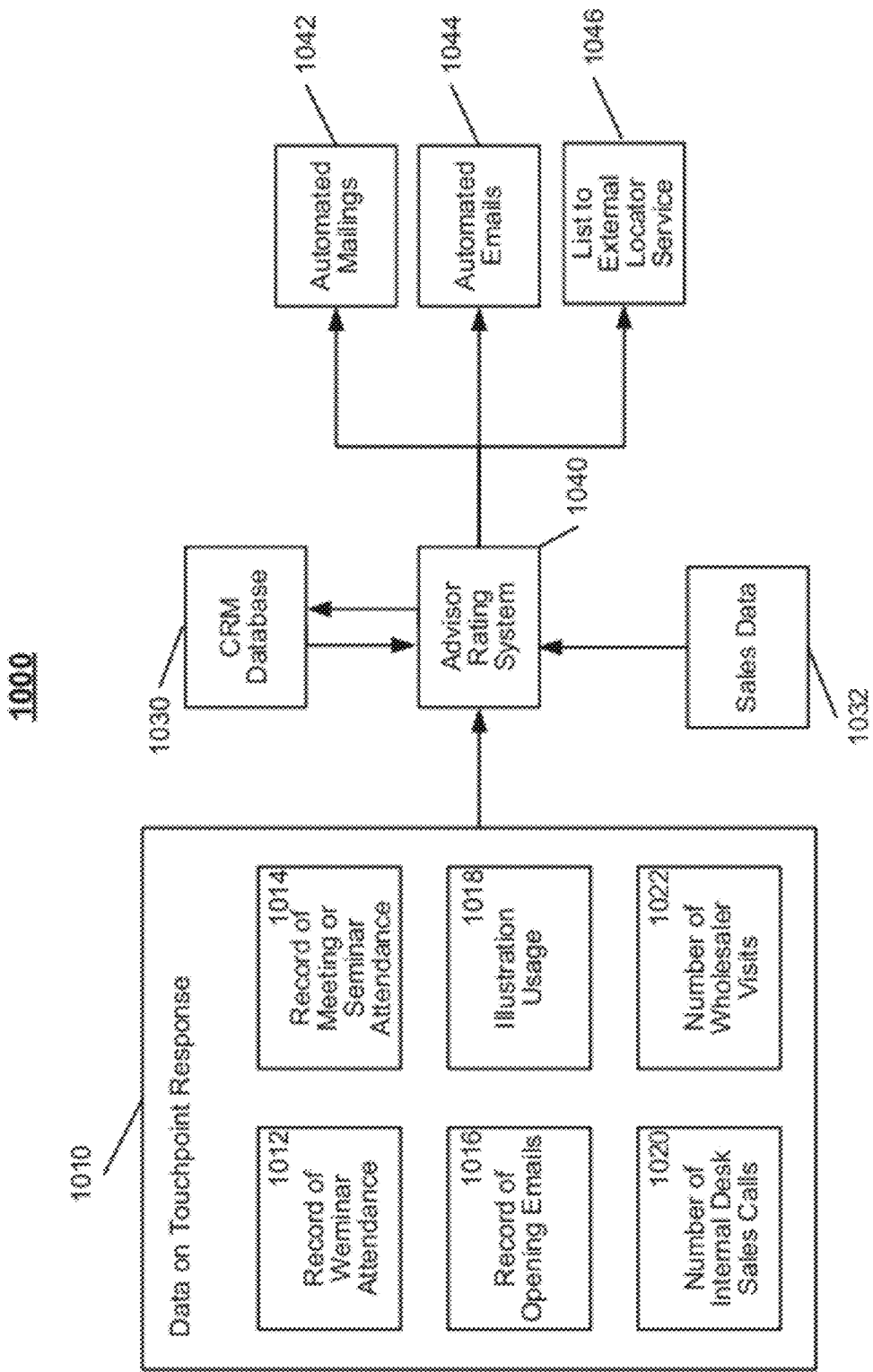
FIG. 10 is a diagram of inputs and outputs of a financial advisor rating system, according to an illustrative embodiment of the invention.

FIG. 10 is a diagram of inputs and automated outputs of the financial advisor rating application. In addition to producing list or map reports as previously discussed, the advisor rating system can feed the report to a customer relationship management (CRM) system, dynamic email system, or similar system that can produce automated communication. In this embodiment, the input to the financial advisor management system includes data on financial advisors' receipt and response to touchpoint data 1010 including the various elements 1012-1022 discussed above, which may have been gathered by and stored on the CRM system. Any additional data from the CRM system, as well as sales data, are also inputs in this embodiment.

The report generated by the advisor rating system 1040 includes an electronic list of financial advisors, their contact information, and a recommended action to take. The CRM software, dynamic email system, or dynamic mailing system receives this electronic report and generates marketing material directed to financial advisors based on the output of the rating system. If a financial advisor is rated highly as a good advisor to target with marketing, and it appears that he may be receptive to email marketing, than an email 1044 is produced automatically tailored to him. The email may be personalized with the advisor's name and contact information, firm name, specialty areas, and topics of interest to the financial advisor. Similarly, if a financial advisor has a high rating and it appears that he may be receptive to a mailing, a physical mailing 1042 is similarly automatically prepared, printed, and sent to the advisor. Alternatively, if a financial advisor has a low rating, it may be preferable to reach out to this advisor using an automated communication, allowing a wholesaler to spend time personally marketing to higher ranked financial advisors. The automatic marketing suggestions and records of the mailings or emails are stored in the CRM database 1030.

The electronic report may also be a list 1046 sent to an external locator service which is accessible by customers through, for example, a website or a call center. When a customer or potential customer calls the call center or visits the website, he may use the external locator service to get a recommendation of one or more financial advisors based on the customer's location, demographic data such as income level, financial needs or interests, or other factors. The external locator service may use data from the list 1046, which includes advisor contact information and/or an advisor identification string along with advisor ratings or grades, as a factor in their own database or rankings of financial advisors. For example, the website may recommend advisors to the user based the ratings described above or based on an automatically generated rating that is different from the financial advisor rating discussed herein, but which may be based in part on the financial advisor rating discussed herein. The website may be searchable by advisor location, and may also provide a listing of all or a subset of all financial advisors known by the financial products company. A call center can be equipped to similarly recommend advisors to customers and provide them with the advisors' contact information, wherein the recommendation is partially based on the financial advisor rating.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for rating at least two insurance agents comprising:
    a database for storing sales history data and data indicative of marketing efforts by an insurance company related to a plurality of insurance agents; and
    an agent rating system processor configured to:
        obtain from the database a first insurance agent's past insurance product sales revenue data indicative of the first insurance agent's insurance product sales levels over a period of time, past insurance product sales frequency data indicative of a number of insurance product sales by the first insurance agent over the period of time, past insurance product sales momentum data indicative of whether the first insurance agent's insurance product sales are increasing or decreasing over the period of time, past insurance product multi-line sales data indicative of whether the first insurance agent sells multiple insurance product lines from a same company, demographic data of the first insurance agent's client base, and data indicative of marketing efforts by the company towards the first insurance agent;
        determine a weighting factor to be applied for each of the past insurance product sales revenue data, the past insurance product sales frequency data, the past insurance product sales momentum data, and the insurance product multi-line sales data;
        calculate an agent score for the first insurance agent based on (1) a sum of a first component based on the past insurance product sales revenue data and its weighting factor, a second component based on the past insurance product sales frequency data and its weighting factor, a third component based on the past insurance product sales momentum data and its weighting factor, and a fourth component based on the insurance product multi-line sales data and its weighting factor, (2) a compatibility between the first insurance agent's clients based on the demographic data and the company's current insurance product line; and (3) a relationship between the first insurance agent's sales history and the company's previous marketing efforts towards the first insurance agent;
        compare the first insurance agent to a second insurance agent using the agent score for the first insurance agent and a similarly obtained agent score for the second insurance agent; and
        electronically generate a report that identifies, based on the comparison between at least two insurance agents, one of the at least two insurance agents to whom the company should market at least one insurance product.

2. The system of claim 1, wherein the agent score is further based on a ratio of a measure of the insurance agent's sales of a first company's products to a measure of the insurance agent's sales of one or more other companies' products.

3. The system of claim 1, wherein the system further comprises a graphical user interface used to display on a map the locations within a geographic region of insurance agents with a first level of sales of a particular insurance product using a first symbol, the locations of insurance agents with a second level of sales of the particular insurance product using a second symbol, and the locations of insurance agents with a third level of sales of the particular insurance product using a third symbol.

4. The system of claim 3, wherein the agent rating system processor is further configured to:
    determine a suggested length of time to spend at the identified one of the insurance agents; and
    generate, based on the suggested length of time to spend at the identified one of the insurance agents, and geographic and travel information related to the geographic region in which an office of the identified one of the insurance agents is located, a marketing route comprising routing information for traveling to the office of the identified one of the insurance agents.

5. The system of claim 1, wherein the agent rating system processor is further configured to automatically generate electronic communication directed towards at least one insurance agent based on the agent scores.

6. A computerized method for insurance company use in rating insurance agents comprising:
- obtaining by a computer a first insurance agent's past insurance product sales revenues data indicative of the first insurance agent's insurance product sales levels over a period of time, past insurance product sales frequency data indicative of a number of insurance product sales by the first insurance agent over the period of time, past insurance product sales momentum data indicative of whether the first insurance agent's insurance product sales are increasing or decreasing over the period of time, past insurance product multi-line sales data indicative of whether the first insurance agent sells multiple insurance product lines from a same company, demographic data of the first insurance agent's client base, and data indicative of marketing efforts by the company towards the first insurance agent;
- determining, by the computer, a weighting factor to be applied for each of the past insurance product sales revenue data, the past insurance product sales frequency data, the past insurance product sales momentum data, and the insurance product multi-line sales data;
- calculating, by the computer, an agent score for the first insurance agent based on (1) a sum of a first component based on the past insurance product sales revenue data and its weighting factor, a second component based on the past insurance product sales frequency data and its weighting factor, a third component based on the past insurance product sales momentum data and its weighting factor, and a fourth component based on the insurance product multi-line sales data and its weighting factor, (2) a compatibility between the first insurance agent's clients based on the demographic data and the company's current insurance product line; and (3) a relationship between the first insurance agent's sales history and the company's previous marketing efforts towards the first insurance agent;
- comparing by the computer the first insurance agent to a second insurance agent using the agent score for the first insurance agent and a similarly obtained agent score for the second insurance agent; and
- generating by the computer a report that identifies, based on the comparison between at least two insurance agents, one of the at least two insurance agents to whom a company should market at least one financial product.

7. The method of claim 6, wherein calculating the agent score further comprises a component based on a ratio of a measure of the insurance agent's sales of a first company's products to a measure of the insurance agent's sales of one or more other companies' products.

8. The method of claim 6, wherein a graphical user interface displays on a map the locations within a geographic region of insurance agents with a first level of sales of a particular insurance product using a first symbol, the locations of insurance agents with a second level of sales of the particular insurance product using a second symbol, and the locations of insurance agents with a third level of sales of the particular insurance product using a third symbol.

9. The method of claim 8, further comprising:
- determining, a suggested length of time to spend at the identified one of the insurance agents; and
- generating, based on the suggested length of time to spend at the identified one of the insurance agents, and geographic and travel information related to the geographic region in which an office of the identified one of the insurance agents is located, a marketing route comprising routing information for traveling to the office of the identified one of the insurance agents.

10. The method of claim 6, further comprising automatically generating electronic communication directed towards at least one insurance agent based on the agent scores.

11. An insurance agent rating system comprising:
- a central processing unit;
- a system memory in communication with the central processing unit;
- the central processing unit executing instructions from the system memory to:
  - identify at least one insurance agent that a company should market at least one financial product to based upon an agent score calculated based on (1) a sum of a first component based on past insurance product sales revenue data indicative of a first insurance agent's insurance product sales levels over a period of time and an associated weighting factor, a second component based on past insurance product sales frequency data indicative of a number of insurance product sales by the first insurance agent over the period of time and an associated weighting factor, a third component based on past insurance product sales momentum data indicative of whether the first insurance agent's insurance product sales are increasing or decreasing over the period of time and an associated weighting factor, and a fourth component based on past insurance product multi-line sales data indicative of whether the first insurance agent sells multiple insurance product lines from a same company and its associated weighting factor, (2) a compatibility between the first insurance agent's clients based on demographic data of the first insurance agent's client base and the company's current insurance product line; and (3) a relationship between the first insurance agent's sales history and the company's previous marketing efforts towards the first insurance agent; and
  - generate a report in response to a request, the report indicating the at least one insurance agent identified based on the agent score within a geographic region.

12. The insurance agent rating system of claim 11, wherein the report request includes a geographic location upon which the identification of the at least one insurance agent should be based.

13. The insurance agent rating system of claim 12, wherein the report generated further displays on a map locations within a geographic region that contains the geographic location of insurance agents with a first level of sales of a particular insurance product using a first symbol, the locations of insurance agents with a second level of sales of the particular insurance product using a second symbol, and the locations of insurance agents with a third level of sales of the particular insurance product using a third symbol.

14. The insurance agent rating system of claim 13, wherein the central processing unit executing instructions from the system memory for:
- determining a suggested length of time to spend at the identified one of the insurance agents; and
- preparing, based on the suggested length of time to spend at the identified one of the insurance agents, and geographic and travel information related to the geographic region in which an office of the identified one of the insurance agents is located, a marketing route comprising routing information for traveling to the office of the identified one of the insurance agents.

15. The insurance agent rating system of claim 12, further comprising receiving the request for the report from a handheld device, wherein the handheld device is configured to detect its own location and sends the detected location in the report request.

16. The system of claim 1, wherein the first component comprises a sum of weighted sales revenue tier data based on past insurance product sales revenue data over a selected period of time, the second component comprises a sum of weighted sales frequency tier data based on the past insurance product sales frequency data over the selected period of time, and the third component comprises a sum of weighted sales momentum data based on the past insurance product sales momentum data over the selected period of time, wherein the weighted sales revenue tier data, the weighed sales frequency tier data, and the weighted sales momentum tier data are weighted more heavily for recent sales data and weighted less heavily for less recent sales data.

17. The system of claim 1, wherein the past insurance product sales revenue data, the past insurance product sales frequency data, and past insurance product sales momentum data include data relating to one or more particular types of insurance annuity products.

18. The system of claim 17, wherein determining the weighting factor comprises weighting the types of annuity products differentially based on one or more of: annuity chassis, death benefit elections, fund selections, living benefit elections, funds tailored for equity growth, and fixed income funds.

19. The system of claim 1, wherein determining the weighting factor comprises using a predictive model for determining, based on the sales history data and the data indicative of marketing efforts by the company, the weighting factor to be applied for each of the past insurance product sales revenue data, the past insurance product sales frequency data, and the past insurance product sales momentum data.

20. The system of claim 2, wherein the advisor rating system processor is further configured to calculate the agent score based on touchpoint data relating to previous marketing attempts made to the insurance agent.

* * * * *